(12) United States Patent
Torvinen et al.

(10) Patent No.: US 11,283,798 B2
(45) Date of Patent: Mar. 22, 2022

(54) NETWORK NODES AND METHODS PERFORMED BY NETWORK NODE FOR SELECTING AUTHENTICATION MECHANISM

(71) Applicant: Telefonaktiebolaget LM Ericsson (publ), Stockholm (SE)

(72) Inventors: Vesa Torvinen, Sauvo (FI); Antonio Alonso Alarcon, Madrid (ES); David Castellanos Zamora, Madrid (ES); Cheng Wang, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 716 days.

(21) Appl. No.: 16/318,692

(22) PCT Filed: May 5, 2017

(86) PCT No.: PCT/EP2017/060773
§ 371 (c)(1),
(2) Date: Jan. 17, 2019

(87) PCT Pub. No.: WO2018/015033
PCT Pub. Date: Jan. 25, 2018

(65) Prior Publication Data
US 2019/0246271 A1    Aug. 8, 2019

(30) Foreign Application Priority Data
Jul. 18, 2016    (WO) ............... PCT/CN2016/090304

(51) Int. Cl.
*H04L 29/06*        (2006.01)
*H04W 12/069*    (2021.01)
(Continued)

(52) U.S. Cl.
CPC ........ *H04L 63/0892* (2013.01); *H04L 63/162* (2013.01); *H04L 63/20* (2013.01);
(Continued)

(58) Field of Classification Search
CPC ... H04L 63/0892; H04L 63/162; H04L 63/20; H04L 63/205; H04W 8/24; H04W 12/069; H04W 88/06
See application file for complete search history.

(56) References Cited

U.S. PATENT DOCUMENTS

2005/0079869 A1* 4/2005 Khalil ................. H04W 8/04
                                                                                 455/435.1
2006/0019635 A1* 1/2006 Ollila ................ H04W 12/122
                                                                                    455/411
(Continued)

FOREIGN PATENT DOCUMENTS

EP    1693995 A1 *  8/2006  ............. H04L 63/08
EP    1 755 311 A1    2/2007
(Continued)

OTHER PUBLICATIONS

3GPP TS 23.799 V0.5.0 (May 2016), 3rd Generation Partnership Project; Technical Specification Group Services and System Aspects; Study on Architecture for Next Generation System (Release 14), 650 Route des Lucioles—Sophia Antipolis, Valbonne, France, 178 Pages.
(Continued)

*Primary Examiner* — John B King
(74) *Attorney, Agent, or Firm* — Sage Patent Group (57) ABSTRACT

Methods and network nodes of a wireless communications network are disclosed. The network nodes are operable to initiate a plurality of authentication mechanisms. Responsive to receipt of a request for authentication transmitted by a terminal device of the wireless communications network,
(Continued)

the network nodes are configured to select an authentication mechanism from the plurality of authentication mechanisms; and are further configured to initiate the selected authentication mechanism to authenticate the terminal device with the wireless communications network.

19 Claims, 8 Drawing Sheets

(51) Int. Cl.
  *H04W 8/24* (2009.01)
  *H04W 88/06* (2009.01)

(52) U.S. Cl.
  CPC ............ *H04W 8/24* (2013.01); *H04W 12/069* (2021.01); *H04L 63/205* (2013.01); *H04W 88/06* (2013.01)

(56) References Cited

U.S. PATENT DOCUMENTS

| | | | | |
|---|---|---|---|---|
| 2006/0077924 | A1* | 4/2006 | Rune | H04L 63/08 370/328 |
| 2006/0140177 | A1* | 6/2006 | Karhu | H04L 29/06 370/356 |
| 2006/0280305 | A1 | 12/2006 | Bajko et al. | |
| 2007/0060097 | A1* | 3/2007 | Edge | H04L 65/4007 455/404.1 |
| 2007/0072587 | A1* | 3/2007 | Della-Torre | H04W 12/122 455/410 |
| 2007/0127495 | A1* | 6/2007 | de Gregorio | H04W 12/06 370/395.52 |
| 2007/0190974 | A1* | 8/2007 | Zhang | H04W 48/18 455/411 |
| 2008/0201454 | A1* | 8/2008 | Softer | H04L 41/00 709/220 |
| 2010/0054222 | A1* | 3/2010 | Rune | H04W 12/062 370/338 |
| 2010/0074179 | A1* | 3/2010 | Akiyoshi | H04W 8/087 370/328 |
| 2017/0094512 | A1* | 3/2017 | Kiss | H04L 63/0884 |
| 2017/0135031 | A1* | 5/2017 | Buckley | H04W 48/16 |

FOREIGN PATENT DOCUMENTS

| | | | |
|---|---|---|---|
| EP | 1 811 744 A1 | 7/2007 | |
| EP | 2 223 495 A1 | 9/2010 | |
| KR | 20090012000 A * | 2/2009 | |
| WO | WO-2007016695 A2 * | 2/2007 | ....... H04L 29/06027 |
| WO | WO 2007/034299 A1 | 3/2007 | |
| WO | WO 2009/080106 A1 | 7/2009 | |
| WO | WO-2010121654 A1 * | 10/2010 | ............ H04M 15/00 |
| WO | WO 2013/009508 A1 | 1/2013 | |
| WO | WO-2013180487 A1 * | 12/2013 | ............ H04W 48/16 |

OTHER PUBLICATIONS

3GPP TS 33.402 V13.0.0 (Sep. 2015),3rd Generation Partnership Project; Technical Specification Group Services and System Aspects; 3GPP System Architecture Evolution (SAE); Security aspects of non-3GPP accesses (Release 13), 650 Route des Lucioles—Sophia Antipolis, Valbonne, France, 56 Pages.

3GPP TR 33.899 V0.2.0 (May 2016), 3rd Generation Partnership Project; Technical Specification Group Services and System Aspects; Study on the security aspects of the next generation system (Release 14), 650 Route des Lucioles—Sophia Antipolis, Valbonne, France, 75 Pages.

International Search Report and Written Opinion of the International Searching Authority for International Application No. PCT/EP2017/060773 dated Sep. 27, 2017.

3GPP TS 23.401 V13.7.0, "3rd Generation Partnership Project; Technical Specification Group Services and System Aspects; General Packet Radio Service (GPRS) enhancements for Evolved Universal Terrestrial Radio Access Network (E-UTRAN) access (Release 13)," Jun. 2016, 372 pages.

3GPP TS 23.402 V13.6.0, "3rd Generation Partnership Project; Technical Specification Group Services and System Aspects; Architecture enhancements for non-3GPP accesses (Release 13)," Jun. 2016, 299 pages.

* cited by examiner

NETWORK NODES AND METHODS PERFORMED BY NETWORK NODE FOR SELECTING AUTHENTICATION MECHANISM

CROSS REFERENCE TO RELATED APPLICATIONS

This application is a 35 U.S.C. § 371 national stage application of PCT International Application No. PCT/EP2017/060773, filed on May 5, 2017, which itself is a continuation of PCT International Application No. PCT/CN2016/090304, filed on Jul. 18, 2016, the disclosure and content of each is incorporated by reference herein in its entirety.

TECHNICAL FIELD

Examples of the present disclosure relate to methods and network nodes for authentication in a wireless communications network.

BACKGROUND

Figure 1:
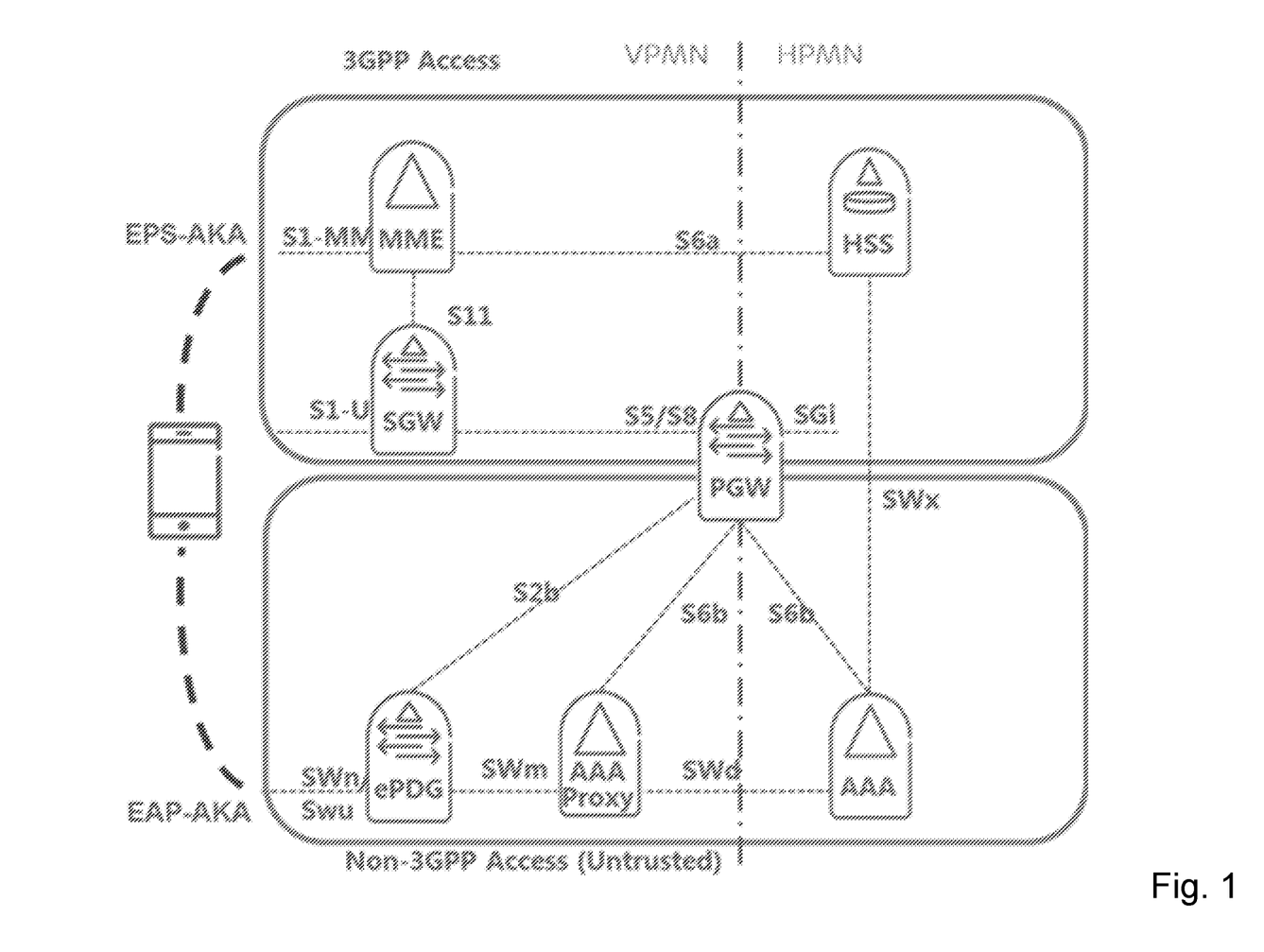
FIG. 1 is a schematic drawing of an authentication framework as defined in 3GPP 23.401 (version 13.7.0) and 23.402 (version 13.6.0)

In current $3^{rd}$ Generation Partnership Project (3GPP) Long Term Evolution (LTE) specifications, the core network supports an authentication framework for authenticating wireless devices accessing the network via a 3GPP access protocol and wireless devices accessing the network via a non-3GPP access protocol; see 3GPP 23.401 (e.g. version 13.7.0) and 23.402 (e.g. version 13.6.0) respectively. FIG. 1 illustrates, at a high level, the authentication architecture defined in these standard specifications.

SUMMARY

Efforts are ongoing to define and implement a wireless communications network meeting the requirements set by the Next Generation Mobile Networks Alliance for the $5^{th}$ generation of mobile networks (5G).

According to Release 13 of the 3GPP standard, authentication always, in case of 3GPP access, takes place using evolved packet system authentication and key agreement (EPS-AKA), in the core network to which the mobile device is attempting to connect (e.g. a visited public mobile network if the device is roaming, or the home public mobile network in non-roaming situations).

However, one goal of the new 5G network is to support authentication of wireless devices connecting to the core network via multiple access networks, including access networks based on different wireless communication protocols (e.g. those specified by 3GPP and non-3GPP protocols), fixed broadband access, and trusted and non-trusted accesses. However, this is complicated by the fact that different access protocols define and require different authentication endpoints anchored in the core network, and rely on different authentication protocols and signalling.

In one aspect of the present disclosure, there is provided a method performed by a network node for initiating authentication. The method comprises: responsive to receipt of a request transmitted from a visited mobile network for authentication of a terminal device having a subscription in a home mobile network, selecting an authentication mechanism from a plurality of authentication mechanisms which the network node is operable to initiate, wherein each authentication mechanism comprises an authentication method and a network location in which the authentication method is to be carried out, and initiating the selected authentication mechanism to authenticate the terminal device.

In another aspect of the disclosure, there is provided a method in a network node of a wireless communications network, the network node being operable to initiate a plurality of authentication mechanisms. The method comprises: responsive to receipt of a request for authentication transmitted by a terminal device of the wireless communications network, selecting an authentication mechanism from the plurality of authentication mechanisms; and initiating the selected authentication mechanism to authenticate the terminal device with the wireless communications network.

In other aspects, there is provided a network node for a wireless communications network, the network node being configured to carry any one of the methods described above.

In a further aspect, there is provided a network node for initiating authentication, comprising processor circuitry and a computer-readable storage medium. The computer-readable storage medium stores instructions that are executable by the processor circuitry whereby the network node is operative to: responsive to receipt of a request for authentication transmitted from a visited mobile network for authentication of a terminal device having a subscription in a home mobile network, select an authentication mechanism from the plurality of authentication mechanisms which the network node is operable to initiate, wherein each authentication mechanism comprises an authentication method and a network location in which the authentication method is to be carried out; and initiate the selected authentication mechanism to authenticate the terminal device.

In still another aspect, there is provided a network node for a wireless communications network, the network node being operable to initiate a plurality of authentication mechanisms and comprising processor circuitry and a computer-readable storage medium. The computer-readable storage medium stores instructions that are executable by the processor circuitry whereby the network node is operative to: responsive to receipt of a request for authentication transmitted by a terminal device of the wireless communications network, select an authentication mechanism from the plurality of authentication mechanisms; and initiate the selected authentication mechanism to authenticate the terminal device with the wireless communications network.

Another aspect of the disclosure provides a network node for a wireless communication network, the network node being operable to initiate a plurality of authentication mechanisms. The network node comprises: a first module configured to, responsive to receipt of a request for authentication transmitted by a terminal device of the wireless communications network, select an authentication mechanism from the plurality of authentication mechanisms; and a second module configured to initiate the selected authentication mechanism to authenticate the terminal device with the wireless communications network.

It should be noted that, although the methods and apparatus set forth are described largely in the context of LTE and networks that may be suitable for providing radio communications meeting one or more of the criteria established by the Next Generation Mobile Networks Alliance for the 5th generation of mobile telecommunications standards (5G), the concepts disclosed herein are in no way limited to LTE or 5G, and are applicable to any wireless communication system.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Although the terms "wireless device" or "terminal device" may be used in the description, it is noted that these terms encompass other terms used to denote wireless devices, such as user equipment (UE). It should be understood by the person skilled in the art that "UE" is a non-limiting term comprising any mobile or wireless device or node equipped with a radio interface allowing for at least one of: transmitting signals in uplink (UL), receiving and/or measuring signals in downlink (DL), and transmitting and/or receiving signals in a D2D/sidelink mode. A wireless device herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "wireless device" or "UE", the terms "mobile device" and "terminal device" may be used interchangeably in the description, and it will be appreciated that such a device does not necessarily have to be 'mobile' in the sense that it is carried by a user. Instead, the term "mobile device" encompasses any device that is capable of communicating with communication networks that operate according to one or more mobile communication standards, such as the Global System for Mobile communications, GSM, Universal Mobile Telecommunications System (UMTS), Long-Term Evolution, LTE, etc.

It should be noted that use of the term "radio access node" as used herein can refer to a base station, such as an eNodeB, a network node in the RAN responsible for resource management, such as a radio network controller (RNC), or, in some cases, a core network node, such as a mobility management entity (MME), a ProSe function (ProSe-F) node or a ProSe Application Server. The term "network node" encompasses radio access nodes, and also nodes within or accessible via a core network. For example, a network node may comprise a server that is located remote from a radio access node, but receives data signals from the radio access node and provides control signals for the radio access node. This latter example reflects the increasing trend in telecommunications systems for functionality to be removed to servers operating in "the cloud".

Figure 2:
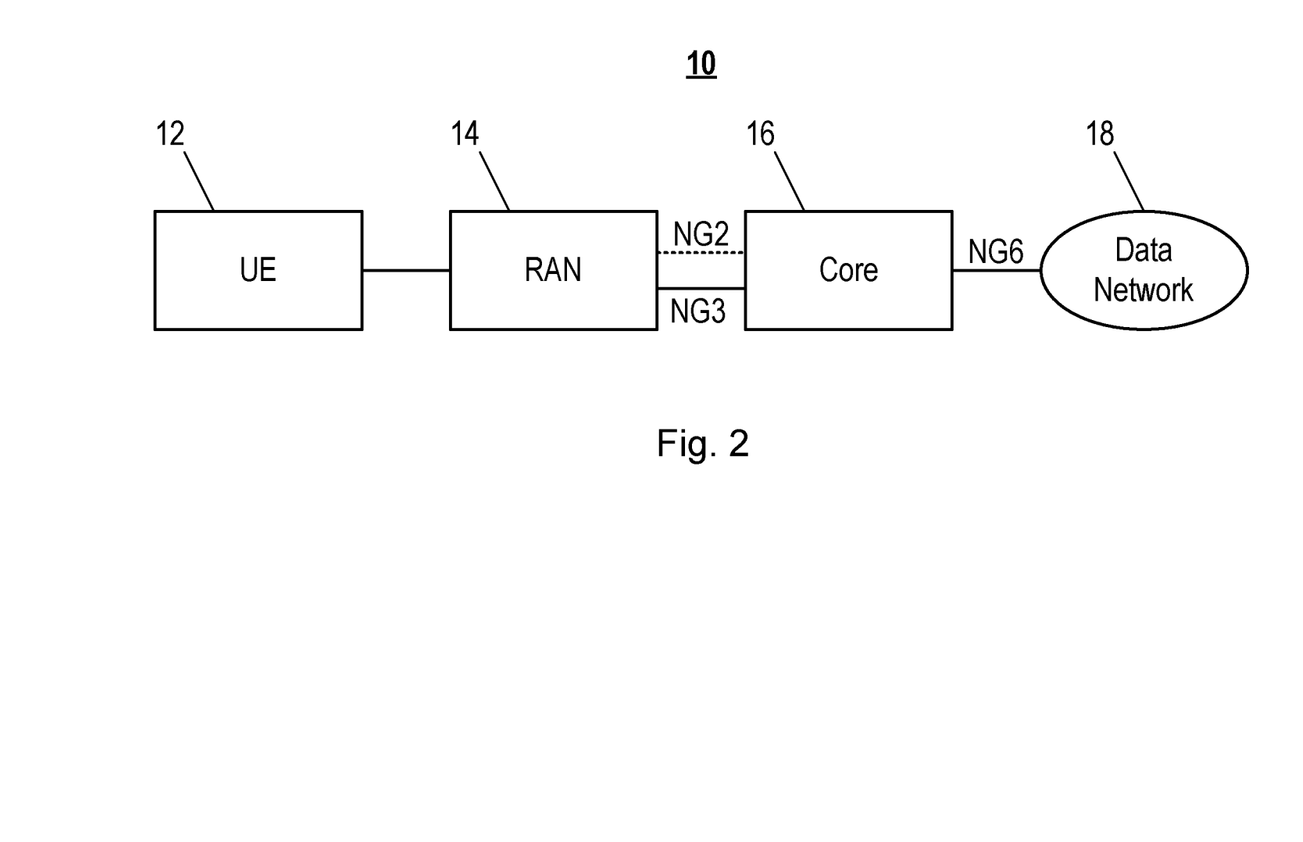
FIG. 2 is a schematic drawing of the architecture of a mobile communications network.

FIG. 2 is a schematic drawing showing the high-level architecture of a wireless communication network 10 in accordance with examples of the disclosure.

The network 10 comprises a radio access network (RAN) 14 that provides wireless coverage to one or more mobile devices, or user equipments (UEs) 12. For example, the RAN 14 may comprise a plurality of cells, each served by a radio access node. Mobile devices 12 within each cell communicate wirelessly with the respective radio access node in order to receive data services and/or voice calls from the network.

The RAN 14 is coupled to a core network (CN) 16 that is operative to provide a number of services to the network 10. For example, the core network 16 is responsible for routing phone calls and data connections from one mobile device to another, or from a mobile device to a particular node within the network 10. The core network 16 may comprise an operations and maintenance centre to configure the nodes within the core network 16, collect statistics on the usage of the network 10 and so forth. The core network 16 may also comprise gateways to interface with other networks.

Two interfaces are illustrated between the RAN 14 and the CN 16: NG2 is the reference point for the control plane between the RAN 14 and the CN 16; NG3 is the reference point for the user plane between the RAN 14 and the CN 16. A control plane interface may also exist directly between the mobile device 12 and the CN 16; although not illustrated, the reference point for this interface may be termed NG1.

The network 10 may further comprise a data network 18 coupled to the CN 16. For example, the data network 18 may be an operator-owned external public or private data network, or an intra-operator data network, e.g. for the provision of services such as IP multimedia subsystem (IMS) services. NG6 is the reference point for the interface between the CN 16 and the data network 18 (this corresponds to the SGi interface for 3GPP accesses).

One of the services provided by the core network 16 is authentication of mobile devices with the network 10; that is, determining whether a particular device requesting a service from the network 10 is authorized to do so or not. For example, authentication may be required when a mobile device first requests to join the network 10, or when a mobile device requests a particular service.

Figure 3:
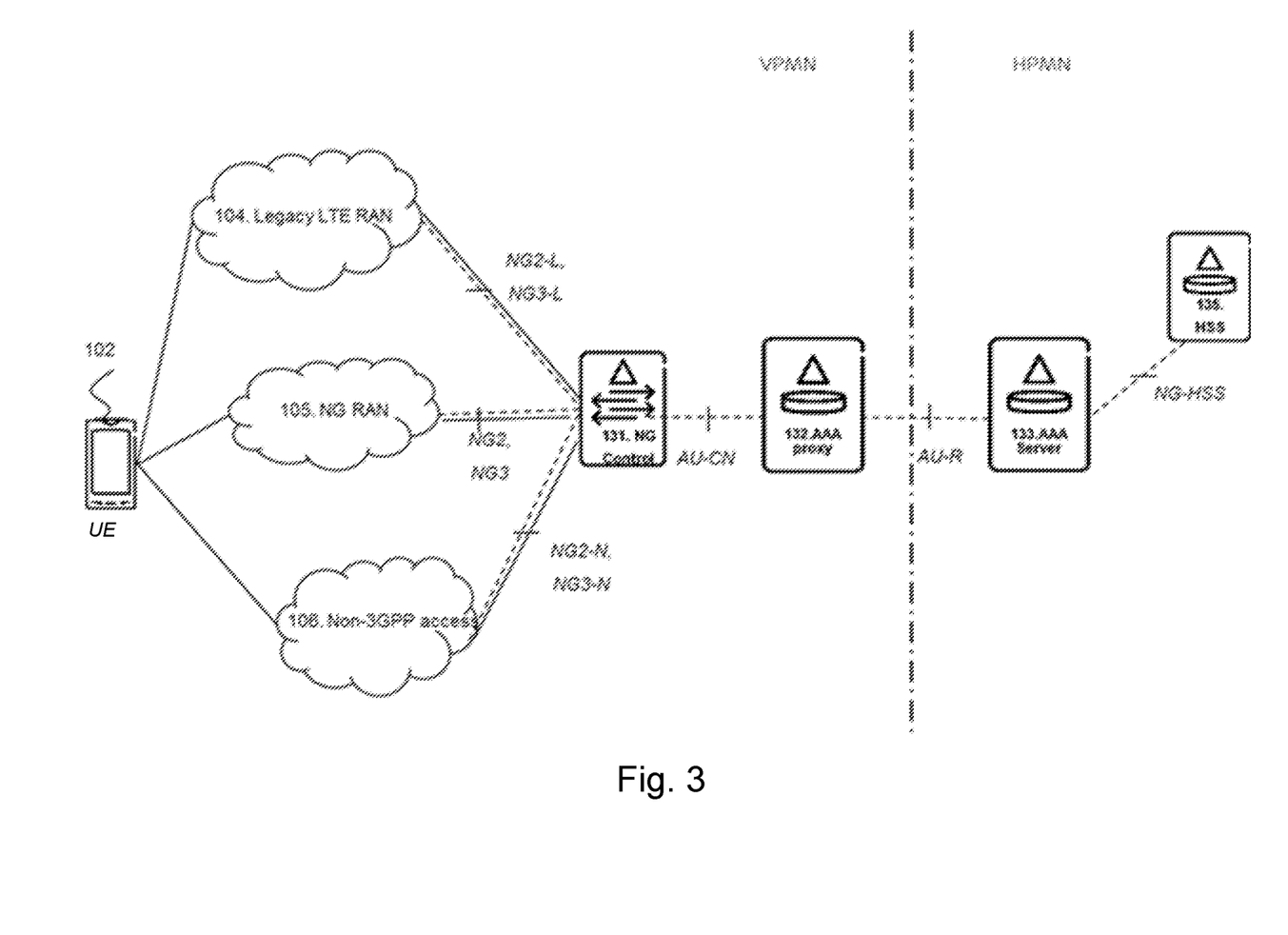
FIG. 3 is a schematic drawing of an authentication framework according to embodiments of the disclosure.

FIG. 3 shows an authentication framework according to embodiments of the disclosure. Those skilled in the art will appreciate that numerous features and components are omitted from the drawing for clarity.

The framework in this embodiment is particularly concerned with a situation in which the mobile device is roaming to a different network than its home network. The visited network may be termed a visited public mobile network (VPMN), while the home network may be termed a home public mobile network (HPMN). The HPMN is the network run by the operator with whom the mobile device has a subscription. The VPMN is any network that isn't the HPMN, to which the mobile device connects while roaming. A mobile device may be "roaming" when it is travelling outside the geographical coverage area of the home network. Note that, in this context, a mobile device may be roaming within the same country as the home network, but outside its coverage (i.e. where the home network does not completely cover a given country) or in a different country to the home network.

In the illustration, the mobile device (UE) 102 has roamed to a different network, and thus connects to the network via a VPMN. The illustration shows three different examples of access methods that may be employed by the mobile device 102. In a first example, the mobile device 102 may connect to a wireless communication network in the form of a legacy 3GPP radio access network (RAN) 104. For example, the legacy 3GPP RAN 104 may comprise a GSM EDGE radio access network (GERAN), a universal terrestrial radio access network (UTRAN) or an evolved UTRAN (E-UTRAN) as defined in any of the 3GPP standard specifications from Rel 13 or earlier. Such radio access networks comprise base stations (also termed NodeBs or eNodeBs), and may also comprise nodes such as radio network controllers (RNCs).

In a second example, the mobile device 102 may connect to the network via a new 3GPP radio access network 105, i.e. one defined in any of the 3GPP standard specifications from Rel 14 or later.

In a third example, the mobile device 102 may connect to the network via a non-3GPP RAN 106, e.g. Code Division Multiple Access 2000 (CDMA2000), cdmaOne, Wifi, wireless local area network (WLAN), Worldwide Interoperability for Microwave Access (WiMax), Ultra Mobile Broadband (UMB), just to mention some options.

It will be understood by those skilled in the art that alternative mechanisms are possible for accessing the core network than merely the illustrated examples. The scope of the disclosure herein is not limited to any particular network access mechanism.

Each access network has an interface to the core network. As noted above, release 14 and onwards of the 3GPP RAN 105 has control plane NG2 and user plane NG3 interfaces with the core network. The legacy 3GPP RAN 104 has control plane NG2-L and user plane NG3-L interfaces with the core network; and the non-3GPP RAN 106 has control plane NG2-N and user plane NG3-N interfaces with the core network. In the illustrated embodiment, the interfaces are with a core network control function 131, or node, of the VPMN.

The core network of the VPMN further comprises a second network node in the form of an authentication, authorization and accounting (AAA) server 132, with an authentication interface AU-CN between the core control function 131 and the AAA server 132. In the illustrated example, where the AAA server 132 is located in the VPMN, the AAA server 132 is termed an AAA proxy 132 and will be referred to as such herein. The AAA proxy 132 and the VPMN core network in general may support one or more different authentication methods including, but not limited to, one or more of evolved packet system authentication and key agreement (EPS-AKA); extensible authentication protocol for universal mobile telecommunications system authentication and key agreement (EAP-AKA); EAP-AKA'; extensible authentication protocol transport layer security (EAP-TLS); and EAP tunnelled TLS (EAP-TTLS). A number of different authentication methods may use the extensible authentication protocol referred to above, and other methods of EAP and EPS may of course be devised in the future. Such EAP and EPS methods may be referred to as, e.g., EAP-AKA*, EAP-TLS*, EPS-AKA* respectively, as common names for all such other EAP and EPS methods, since their actual names naturally are not currently known.

The home public mobile network (HPMN) is the network where the mobile device 102 has a subscription. The HPMN comprises an AAA server 133, which may support the same authentication methods as the AAA proxy 132, or different authentication methods (i.e. including a subset of the methods supported by the proxy 132 and/or additional methods not supported by the proxy 132). The AAA server 133 is coupled to the AAA proxy 132 via an authentication interface AU-R.

The HPMN also comprises a home subscriber server (HSS) 135 coupled to the AAA server 133 via an interface NG-HSS. The HSS contains a database listing all the subscribers for the HPMN and related information (such as mobile device identity, subscriber profiles, security profiles which dependent on credential used by one or another mobile device may be in the form of authentication vectors or certificates, etc). The HSS 135 may additionally be able to provide information about the subscriber's location and IP information. In alternative embodiments, a GSM home location register (HLR) or Authentication centre (AuC) may carry out these tasks or a part of these tasks. The AuC may for example only be responsible for the generation of authentication vectors.

Figure 4:
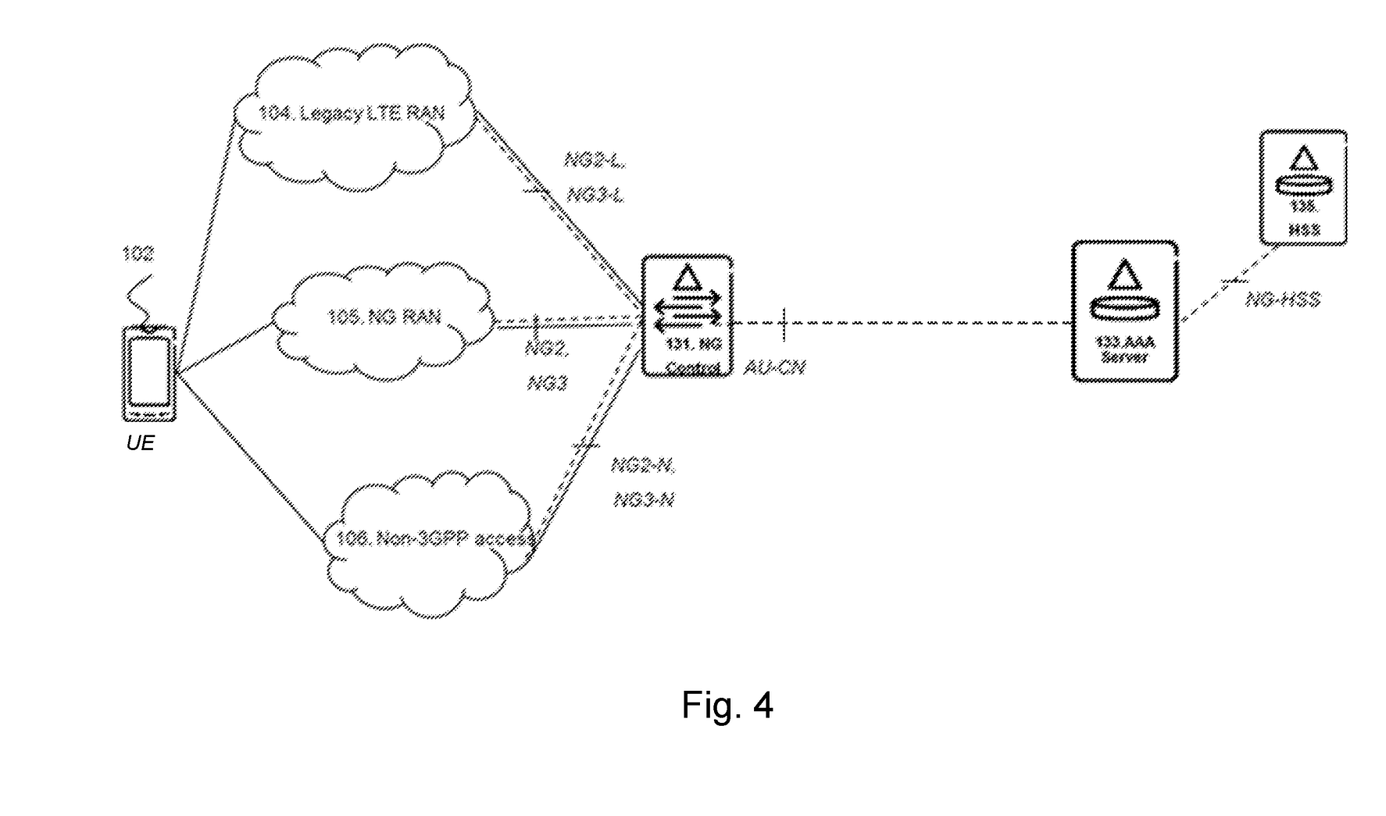
FIG. 4 is a schematic drawing of an authentication framework according to further embodiments of the disclosure.

FIG. 4 shows another authentication framework according to embodiments of the disclosure. The framework shown in FIG. 4 is similar to that shown in FIG. 3, but relates to the case in which the mobile device 102 is not roaming.

Thus the mobile device 102 connects to its home network via one or other of the access networks 104, 105, 106, but the authentication framework omits the AAA proxy 132 shown in FIG. 3. Rather, the core control function 131 connects directly to the AAA server 133 in the HPMN (as the mobile device 102 is not visiting another network).

Figure 5A:
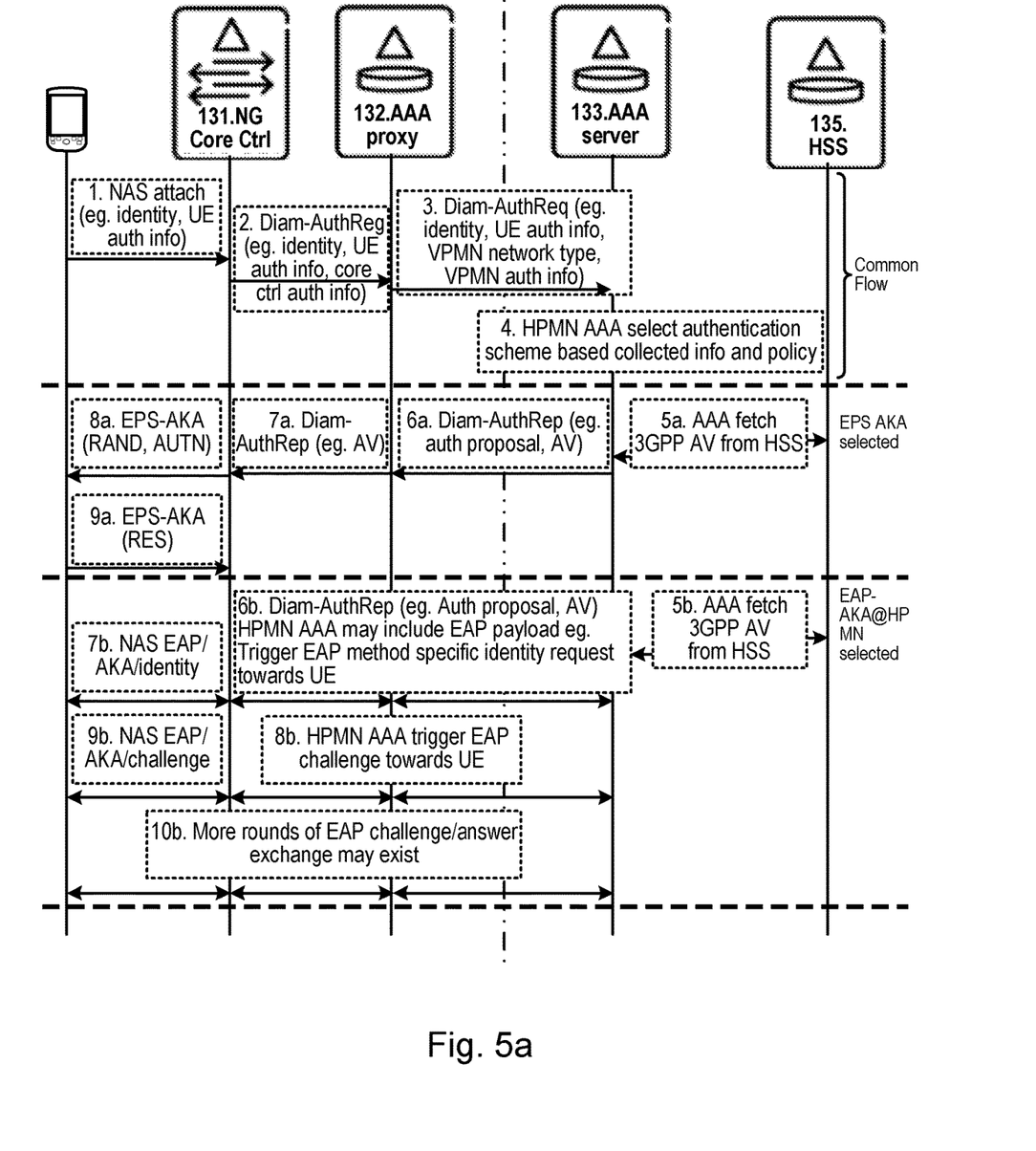
FIGS. 5a and 5b show a signalling diagram of various authentication mechanisms according to embodiments of the disclosure.
Figure 5B:
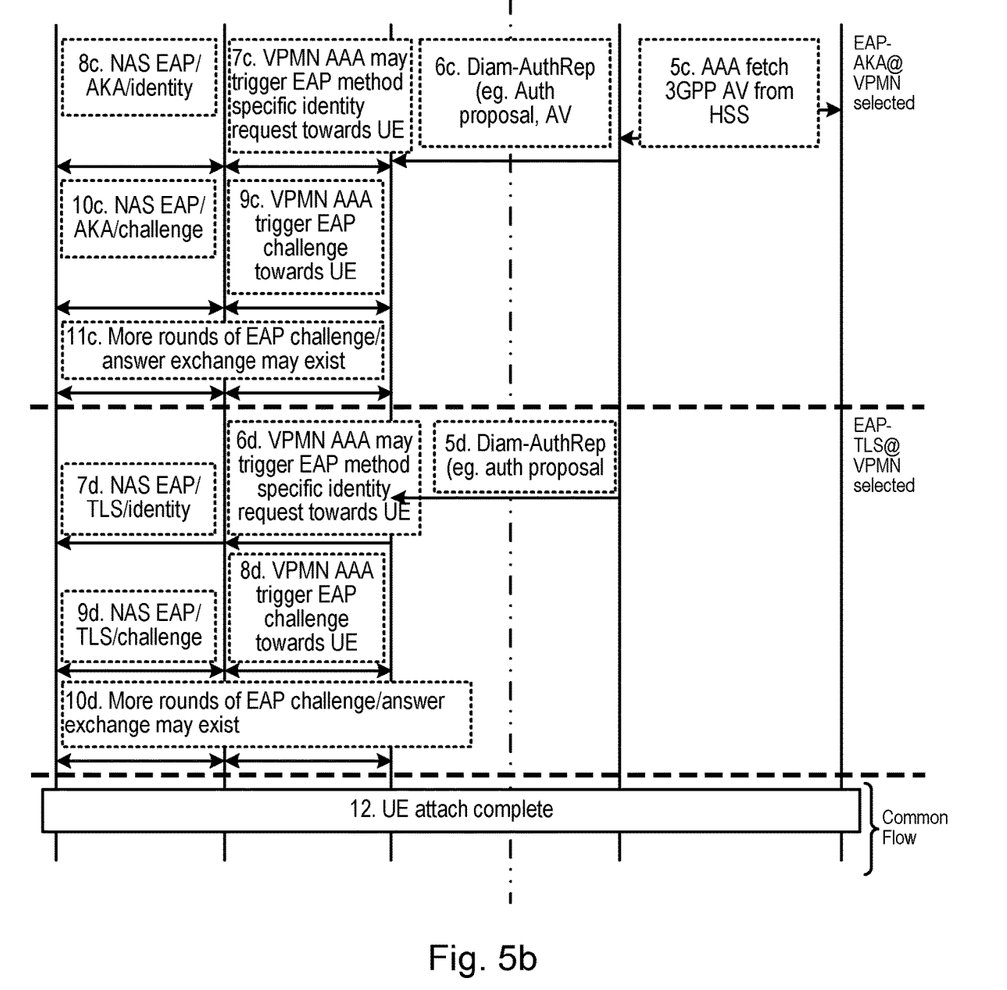

FIGS. 5a and 5b show a signalling diagram for an authentication process according to embodiments of the present disclosure. The figure illustrates the signalling for the embodiment shown in FIG. 3 (i.e. the roaming case); however, those skilled in the art will understand that the concepts recited herein are equally applicable to the non-roaming case, as shown in FIG. 4, with trivial amendments to remove signalling to and from the AAA proxy.

Further, the signalling diagram illustrates only four different authentication mechanisms, i.e. evolved packet system authentication and key agreement (EPS-AKA); extensible authentication protocol for universal mobile telecommunications system authentication and key agreement (EAP-AKA) at the HPMN; EAP-AKA at the VPMN; and extensible authentication protocol transport layer security (EAP-TLS) at the VPMN. However, the principles described herein are applicable to any authentication method executed in the HPMN or the VPMN. The disclosure is not limited to only those authentication mechanisms shown in FIG. 5.

Step 1. The mobile device 102 transmits a request for authentication to the core network control function 131. For example, the request for authentication may be comprised within an initial request to attach to the network (i.e. when the mobile device 102 first attempts to attach to the network). The request for authentication may be transmitted using non-access stratum (NAS) signalling, and in the illustrated embodiment is transmitted directly from the mobile device 102 to the core control function 131 (i.e. over the NG1 interface). In alternative embodiments, the request may be transmitted to the access network 104, 105, 106, and relayed to the core control function 131.

The request for authentication may contain data such as one or more of: the mobile device identity (e.g. IMSI), and the authentication method supported and/or preferred by the mobile device, e.g. EPS-AKA, EAP-AKA, EAP-AKA', EAP-TLS, etc. Note that, according to some embodiments, the mobile device 102 may choose its identity according to the network to which it is attempted to connect. If the mobile device accesses a corporate network, it may choose a corporate ID; if the mobile device accesses a mobile network operator (MNO) network, it may choose a subscriber ID.

Step 2. The core control function 131 forwards the authentication request to the AAA proxy 132. The forwarded authentication request may use diameter or radius signalling protocols, for example. The forwarded authentication request may include the mobile device identity, and the preferred/supported authentication method included in the original message from the mobile device 102. The forwarded authentication request may additionally include information to support authentication. For example, such information may include one or more of the access network type to which the mobile device is connected, core control authentication information, etc.

Step 3. The AAA proxy 132 in VPMN forwards the authentication request, via the AU-R interface, to the AAA server 133 in HPMN. Again, the message may use diameter or radius signalling protocols. The message transmitted by the AAA proxy 132 may include all of the information from the message transmitted in step 2 (i.e. the mobile device identity, the preferred/supported authentication method, information to support authentication, etc). Additionally, the AAA proxy 132 may add further information to support authentication. Such further information may include one or more of the VPMN network type, the authentication method implemented in the VPMN, etc.

Step 4. The AAA server 133 receives the authentication request, selects a mechanism with which to authenticate the mobile device 102, and then initiates the selected mechanism through signalling to other nodes of the network.

The selected authentication mechanism may comprise selections of one or more of: the particular authentication method (e.g. EPS-AKA, EAP-AKA, EAP-AKA', EAP-TLS, etc), the network in which the authentication is to take place (e.g. VPMN or HPMN), and the authentication framework in which the authentication is to take place (e.g. the core network, or an external vendor-specified framework). Thus the authentication mechanism may not merely be the method by which the authentication takes place, it may specify where the authentication takes place and/or within which framework. That is to say, a first authentication mechanism using a particular authentication method (e.g. EPS-AKA) is different from a second authentication mechanism using the same authentication method but carried out in a different location (e.g. the VPMN as opposed to the HPMN).

The selection may be dependent on some or all of the information contained in the authentication request transmitted by the AAA proxy 132. The selection may additionally be dependent on one or more of the mobile device's subscription information and policies defined by an operator of the HPMN.

For example, where it is available, the mobile device identity may be known to support only a single authentication method. In that case, the supported authentication method may be selected as part of the selected mechanism.

In cases where the mobile device 102 is roaming, the AAA server 133 may preferentially select authentication mechanisms in which the authentication method is carried out in the VPMN, as such mechanisms may benefit from reduced overall signalling. If the authentication method supported by the mobile device 102 are not supported by the VPMN (or if none of the multiple authentication methods is supported by the VPMN), however, the authentication mechanism may default to one in which the authentication method is carried out in the HPMN. In some embodiments, the authentication methods supported by the mobile device 102 may be defined by its subscription to the HPMN, so there is a high likelihood that authentication methods supported by the mobile device 102 will also be supported by the HPMN.

The selection of an authentication mechanism may additionally or alternatively be based on operator-configured authentication policies (e.g. AKA for roaming 3GPP & non-3GPP access cases, certificates (for TLS and TTLS) for 3GPP & non-3GPP home access).

Once the authentication mechanism is selected by the AAA server 133, the AAA server 133 goes on to initiate the selected authentication mechanism. FIG. 5a shows two examples in which EPS AKA and EAP-AKA in the HPMN are selected (labelled with suffixes a and b respectively). FIG. 5b shows two further examples in which EAP-AKA in the VPMN and EAP-TLS in the VPMN are selected (labelled with suffixes c and d respectively).

In the case where EPS-AKA is chosen:

Step 5a. The AAA server 133 obtains the AKA authentication vectors (AV) from the HSS 135.

Step 6a. The AAA server 133 sends a reply to the AAA proxy 132 indicating the selected authentication mechanism proposed (i.e. EPS AKA running at VPMN) and the AV. The reply may be transmitted using diameter or radius protocols, for example.

Step 7a. The AAA proxy 132 receives the authentication response from the AAA server 133 and forwards to the core control function 131 a message indicating the running of EPS AKA for mobile device authentication, and including the AV.

Steps 8a-9a. The EPS AKA procedure is running between the mobile device 102 and the core control function 131.

In the case where EAP-AKA running at HPMN is chosen:

Step 5b. The AAA server 133 obtains the AKA authentication vectors (AV) from the HSS 135.

Step 6b. The AAA server 133 sends a reply to the AAA proxy 132 indicating the selected authentication scheme (i.e. EAP AKA running at HPMN). The reply message may also comprise an EAP payload to trigger an EAP method specific identity request towards the mobile device 102. This message is then forwarded by the AAA proxy 132 to the core control function 131.

Steps 8b-10b. The EPS AKA procedure is now running between the mobile device 102 and the AAA server 133.

In the case where EAP-AKA running at VPMN is chosen:

Step 5c. The AAA server 133 obtains the AKA authentication vectors (AV) from the HSS 135.

Step 6c. The AAA server 133 sends a reply to the AAA proxy 132 indicating the selected authentication scheme (EAP AKA running at VPMN) and AV.

Step 7c. The AAA proxy 132 receives the authentication response from the AAA server 133 and forwards a message to the core control function 131 indicating the running of EAP AKA at VPMN for mobile device authentication. In the message, the AAA proxy 132 may also include an EAP payload to trigger EAP method specific identity request.

Steps 8c-11c. EAP AKA procedure is running between the mobile device 102 and the AAA proxy 132.

In the case where EAP-TLS running at the VPMN is chosen:

Step 5d. The AAA server 133 sends a reply to the AAA proxy 132 indicating the selected authentication scheme (EAP TLS running at VPMN).

Step 6d. The AAA proxy 132 receives the authentication response from the AAA server 133 and forwards a message to the core control function 131 indicating the running of EAP TLS at VPMN for mobile device authentication. In the message, the AAA proxy 132 may also include an EAP payload to trigger EAP method specific identity request.

Steps 8d-11d. EAP TLS procedure is running between the mobile device 102 and the AAA proxy 132.

In step 12, once the selected authentication mechanism is complete, the mobile device 102 is attached to the network.

Figure 6:
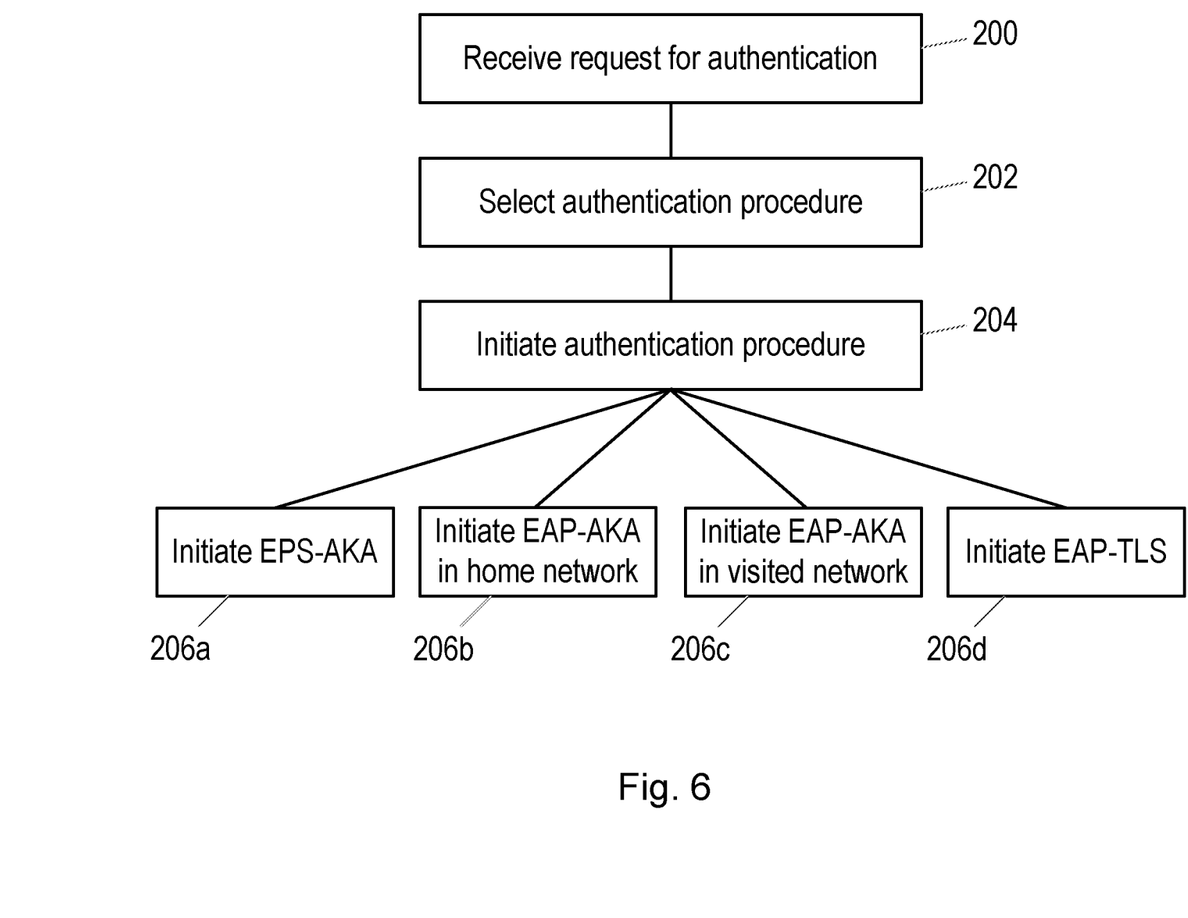
FIG. 6 is a flow chart of a method according to embodiments of the disclosure.

FIG. 6 is a flowchart of a method according to embodiments of the disclosure. The method may be carried out in a network node of a wireless communications network; for example, a core network node such as the AAA server 133. The wireless communications network may be capable of implementing a plurality of different authentication mechanisms.

In step 200, the network node receives a request for authentication of a mobile device with the wireless communications network. The request for authentication may be received from a core network control function (e.g. the core network control function 131 shown in FIG. 4) or, in the roaming case, from a network node in another mobile network (e.g. the AAA proxy 132 in the VPMN). The request for authentication may be initiated by a request for authentication transmitted by the mobile device, e.g., upon its initial connection to the network.

The request for authentication may contain one or more of: the mobile device identity (e.g. IMSI), the authentication method(s) preferred or supported by the mobile device, and information to support authentication. In the roaming case, where the request for authentication is received from a VPMN (e.g. an AAA proxy) the request for authentication may additionally contain one or more of: the VPMN network type, and the authentication method(s) supported by in the VPMN.

In step 202, the network node selects an authentication mechanism from the plurality of available authentication mechanisms.

The selection may comprise selections of one or more of: the particular authentication method (e.g. EPS-AKA, EAP-AKA, EAP-AKA', EAP-TLS, etc), the network in which the authentication is to take place (e.g. VPMN or HPMN), and the authentication framework in which the authentication is to take place (e.g. the core network, or an external vendor-specified framework). Thus the authentication mechanism may not merely be the method by which the authentication takes place, it may specify where the authentication takes place and/or within which framework. That is to say, a first authentication mechanism using a particular authentication method (e.g. EPS-AKA) is different from a second authentication mechanism using the same authentication method but carried out in a different location (e.g. the VPMN as opposed to the HPMN).

The selection may be dependent on some or all of the information contained in the authentication request received in step 200. The selection may additionally be dependent on one or more policies defined by an operator of the network node.

For example, where it is available, the mobile device identity may be known to support only a single authentication method. In that case, the supported authentication method may be selected as part of the selected mechanism.

In cases where the mobile device is roaming, the network node may preferentially select authentication mechanisms in which the authentication method is carried out in the VPMN, as such mechanisms may benefit from reduced overall signalling. If the authentication method supported by the mobile device are not supported by the VPMN (or if none of the multiple authentication methods is supported by the VPMN), however, the authentication mechanism may default to one in which the authentication method is carried out in the HPMN. In some embodiments, the authentication methods supported by the mobile device may be defined by its subscription to the HPMN, so there is a high likelihood that authentication methods supported by the mobile device will also be supported by the HPMN.

The selection of an authentication mechanism may additionally or alternatively be based on operator-configured authentication policies (e.g. AKA for roaming 3GPP & non-3GPP access cases, certificates (for TLS and TTLS) for 3GPP & non-3GPP home access).

Once the authentication mechanism is selected in step 202, the network node goes on to initiate the selected authentication mechanism in step 204. The initiation of the mechanism may comprise, for example, steps of transmitting one or more signals to the core control function, an AAA proxy, or an HSS according to the selected authentication mechanism. EPS-AKA, EAP-AKA in HPMN, EAP-AKA in VPMN or EAP-TLS may be initiated in steps 206a to 206d respectively. However, alternative authentication methods are possible and the present disclosure is not limited to those listed in FIG. 6. For further details regarding these authentication methods, the reader is directed to FIGS. 5a and 5b.

Figure 7:
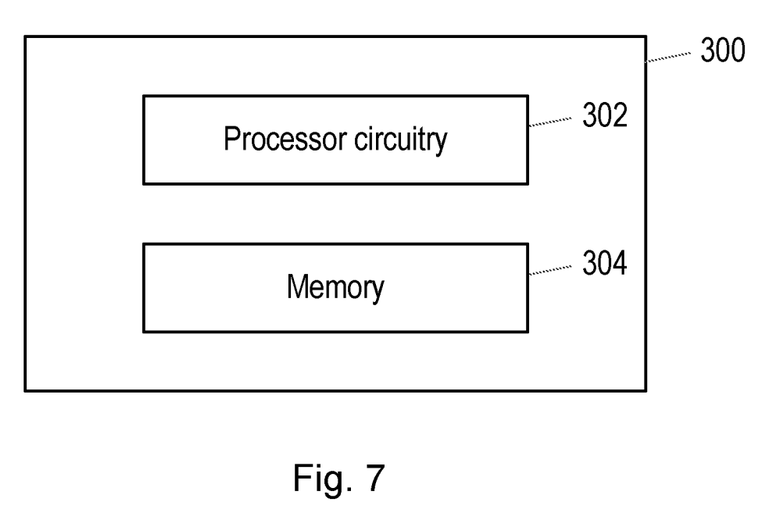
FIG. 7 is a schematic diagram of a network node according to embodiments of the disclosure.

FIG. 7 is a schematic drawing of a network node 300 in accordance with embodiments of the disclosure. The network node 300 may be a core network node, such as an AAA server. The network node 300 may be operable as the AAA server 133 shown in FIGS. 3, 4, 5a and 5b. The network node 300 may also be operable to carry out the method shown in FIG. 6.

The network node 300 comprises a processor 302 and a memory 304. The memory 304 contains instructions executable by the processor 302. The network node 300 may be operable to initiate a plurality of authentication mechanisms. The network node 300 is operative to: select, responsive to receipt of a request for authentication transmitted by a terminal device of the wireless communications network, an authentication mechanism from the plurality of authentication mechanisms; and initiate the selected authentication mechanism to authenticate the terminal device with the wireless communications network.

The network node 300 may further comprise one or more interfaces (not illustrated) for communicating with a home subscriber server, for communicating with a core network control function or node, and for communicating with one or more AAA servers (proxies) in other networks.

Figure 8:
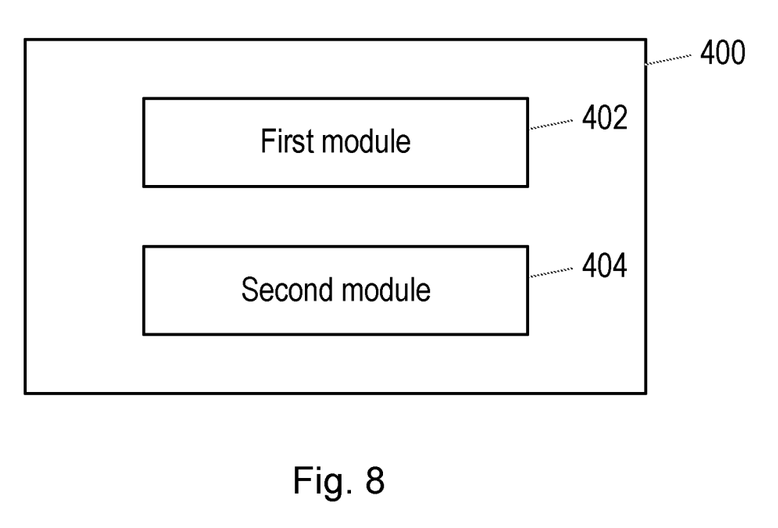
FIG. 8 is a schematic diagram of a network node according to further embodiments of the disclosure.

FIG. 8 is a schematic drawing of a further network node 400 in accordance with examples of the disclosure. The network node 400 may be a core network node, such as an AAA server. The network node 400 may be operable as the AAA server 133 shown in FIGS. 3, 4, 5*a* and 5*b*. The network node 400 may also be operable to carry out the method shown in FIG. 6.

The network node 400 may be operable to initiate a plurality of authentication mechanisms. The network node 400 comprises a first module 402 configured to select, responsive to receipt of a request for authentication transmitted by a terminal device of the wireless communications network, an authentication mechanism from the plurality of authentication mechanisms; and a second module configured to initiate the selected authentication mechanism to authenticate the terminal device with the wireless communications network.

The network node 400 may further comprise one or more interface modules (not illustrated) for communicating with a home subscriber server, for communicating with a core network control function or node, and for communicating with one or more AAA servers (proxies) in other networks.

The present disclosure thus provides, in a situation where the core network supports multiple authentication schemes (e.g. EPS-AKA, EAP-AKA, EAP-TLS, or any other alternative authentication schemes), or where different authentication schemes are supported at the visited and home network, a new method as to how a network node shall select and handle authentication of a mobile device.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method for initiating authentication, the method being performed by a network node located in a core network of a home mobile network and comprising:
   responsive to receipt of a request transmitted from a visited mobile network for authentication of a terminal device having a subscription in the home mobile network, selecting an authentication mechanism from a plurality of authentication mechanisms which the network node is operable to initiate, wherein each authentication mechanism comprises an authentication method and a network location in which the authentication method is to be carried out and which network location is either the home mobile network or the visited mobile network, and
   initiating the selected authentication mechanism to authenticate the terminal device.

2. The method according to claim 1, wherein the request for authentication comprises at least one of: an identity of the terminal device; an authentication mechanism requested by the terminal device; and an authentication capability of the terminal device, and
   wherein selecting the authentication mechanism comprises selecting the authentication mechanism in dependence on the at least one of the identity of the terminal device; the authentication mechanism requested by the terminal device; and the authentication capability of the terminal device.

3. The method according to claim 1, wherein selecting the authentication mechanism comprises selecting the authentication mechanism in dependence on at least one of: authentication capability of the visited mobile network; subscription information for the terminal device; and at least one operator-defined policy.

4. The method according to claim 2, further comprising:
   receiving a request for authentication from a core network control node, the request for authentication from the core network control node comprising at least one of: the identity of the terminal device; the authentication mechanism requested by the terminal device; and the authentication capability of the terminal device.

5. The method according to claim 2, wherein selecting the authentication mechanism comprises selecting the authentication mechanism in dependence on at least one of: authentication capability of the visited mobile network; and a network type of the visited mobile network.

6. The method according to claim 5, further comprising:
   receiving a request for authentication from a second network node of the visited mobile network, the request for authentication from the second network node of the visited mobile network comprising at least one of: the identity of the terminal device; the authentication mechanism requested by the terminal device; the authentication capability of the terminal device; the authentication capability of the visited mobile network; and the network type of the visited mobile network.

7. The method according to claim 1, wherein each authentication mechanism comprises an authentication framework in which the authentication method is to be carried out, and wherein the authentication framework comprises a 3GPP framework and a non-3GPP framework.

8. The method according to claim 1, wherein the authentication mechanisms comprise at least one of: evolved packet system authentication and key agreement (EPS-AKA); extensible authentication protocol for universal mobile telecommunications system authentication and key agreement (EAP-AKA); other EAP-AKAs; extensible authentication protocol transport layer security (EAP-TLS); and EAP tunnelled TLS (EAP-TTLS).

9. The method according to claim 1, wherein the network node is an authentication, authorization and accounting server.

10. A network node for initiating authentication, comprising processor circuitry and a computer-readable storage medium, the computer-readable storage medium storing instructions that are executable by the processor circuitry whereby the network node is located in a core network of a home mobile network and is operative to:
    responsive to receipt of a request for authentication transmitted from a visited mobile network for authentication of a terminal device having a subscription in the home mobile network, select an authentication mechanism from a plurality of authentication mechanisms which the network node is operable to initiate, wherein each authentication mechanism comprises an authentication method and a network location in which the authentication method is to be carried out and which network location is either the home mobile network or the visited mobile network; and initiate the selected authentication mechanism to authenticate the terminal device.

11. The network node according to claim 10, wherein the request for authentication comprises at least one of: an identity of the terminal device; an authentication mechanism requested by the terminal device; and an authentication capability of the terminal device, and wherein the computer-readable storage medium stores instructions that are executable by the processor circuitry whereby the network node is further operative to select the authentication mechanism by selecting the authentication mechanism in dependence on the at least one of the identity of the terminal device; the authentication mechanism requested by the terminal device; and the authentication capability of the terminal device.

12. The network node according to claim 10, wherein the computer-readable storage medium stores instructions that are executable by the processor circuitry whereby the network node is further operative to select the authentication mechanism by selecting the authentication mechanism in dependence on at least one of: authentication capability of the visited mobile network; subscription information for the terminal device; and at least one operator-defined policy.

13. The network node according to claim 11, wherein the computer-readable storage medium stores instructions that are executable by the processor circuitry whereby the network node is further operative to:

receive a request for authentication from a core network control node, the request for authentication from the core network control node comprising at least one of: the identity of the terminal device; the authentication mechanism requested by the terminal device; and the authentication capability of the terminal device.

14. The network node according to claim 13, wherein the computer-readable storage medium stores instructions that are executable by the processor circuitry whereby the network node is further operative to select the authentication mechanism by selecting the authentication mechanism in dependence on at least one of: authentication capability of the visited mobile network; and a network type of the visited mobile network.

15. The network node according to claim 14, wherein the computer-readable storage medium stores instructions that are executable by the processor circuitry whereby the network node is further operative to:

receive a request for authentication from a second network node of the visited mobile network, the request for authentication from the second network node of the visited mobile network comprising at least one of: the identity of the terminal device; the authentication mechanism requested by the terminal device; the authentication capability of the terminal device; the authentication capability of the visited mobile network; and the network type of the visited mobile network.

16. The network node according to claim 10, wherein each authentication mechanism comprises an authentication framework in which the authentication method is to be carried out, and wherein the authentication framework comprises a 3GPP framework and a non-3GPP framework.

17. The network node according to claim 10, wherein the authentication mechanisms comprise at least one of: evolved packet system authentication and key agreement (EPS-AKA); extensible authentication protocol for universal mobile telecommunications system authentication and key agreement (EAP-AKA); other EAP-AKAs; extensible authentication protocol transport layer security (EAP-TLS); and EAP tunnelled TLS (EAP-TTLS).

18. The network node according to claim 10, wherein the request for authentication transmitted by the terminal device forms part of a request to connect to the visited mobile network.

19. The network node according to claim 10, wherein the network node is an authentication, authorization and accounting server.

* * * * *